United States Patent
Kuroda

(10) Patent No.: US 9,258,710 B2
(45) Date of Patent: Feb. 9, 2016

(54) WIRELESS COMMUNICATION DEVICE, WIRELESS COMMUNICATION METHOD, REMOTE OPERATION DEVICE AND REMOTE OPERATION METHOD

(71) Applicant: Panasonic Intellectual Property Corporation of America, Torrance, CA (US)

(72) Inventor: Toyoharu Kuroda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/269,237

(22) Filed: May 5, 2014

(65) Prior Publication Data

US 2014/0359732 A1      Dec. 4, 2014

(30) Foreign Application Priority Data

May 29, 2013  (JP) .................................. 2013-112604

(51) Int. Cl.
*H04W 12/00*      (2009.01)
*H04W 12/06*      (2009.01)
*H04W 4/00*       (2009.01)

(52) U.S. Cl.
CPC .............. *H04W 12/06* (2013.01); *H04W 4/008* (2013.01)

(58) Field of Classification Search
CPC combination set(s) only.
See application file for complete search history.

(56) References Cited

U.S. PATENT DOCUMENTS

| 2006/0098099 | A1  | 5/2006  | Koide |
| 2010/0091987 | A1  | 4/2010  | Takahashi et al. |
| 2010/0315279 | A1* | 12/2010 | Hamai et al. .................. 341/176 |

FOREIGN PATENT DOCUMENTS

| JP | 2005-217646 | 8/2005 |
| JP | 2006-166406 | 6/2006 |
| JP | 2007-259385 | 10/2007 |
| JP | 2010-098472 | 4/2010 |
| JP | 2010-171657 | 8/2010 |

\* cited by examiner

*Primary Examiner* — Ghazal Shehni

(74) *Attorney, Agent, or Firm* — Wenderoth, Lind & Ponack, L.L.P.

(57) ABSTRACT

From a remote control device, a pairing command including an authentication key is transmitted to a slave device by an infrared ray remote control signal by first depression of a push button. The slave device transmits an authentication key, which is generated based on the received authentication key, through a wireless LAN. By second depression of the push button, the remote control device transmits a pairing command, which includes an authentication key, to a master device by an infrared ray remote control signal. The master device compares the authentication key, which is received through the wireless LAN, and the authentication key, which is received by the infrared ray remote control signal, with each other, and transmits a pairing authorization to the slave device through the wireless LAN if both of the authentication keys coincide with each other. The slave device receives the pairing authorization, and establishes pairing.

11 Claims, 14 Drawing Sheets

WIRELESS COMMUNICATION DEVICE, WIRELESS COMMUNICATION METHOD, REMOTE OPERATION DEVICE AND REMOTE OPERATION METHOD

BACKGROUND

1. Technical Field

The present disclosure relates to an initial setting of inter-device communication, that is, inter-device pairing in a wireless communication device. Particularly, the present disclosure relates to pairing between electrical appliances, each of which has a wireless LAN or a specified low power radio network mounted thereon.

2. Description of the Related Art

In recent years, instruments, each of which has a wireless LAN or a specified low power radio network mounted thereon, have been increased in response to miniaturization and weight reduction of computers, to a progress of the wireless communication technology, and further to popularization of the cloud computing.

Unlike wired communication that can securely form a network group (hereinafter, referred to as a subnet) by only connecting a communication cable, in such wireless communication, a secure subnet can be formed only after a detailed initial setting (including a setting of a code rule) of communication, which is in accordance with communication protocol, is performed. However, as the wireless communication has been being mounted on consumer instruments, it has been a problem that an initial setting of communication thereof is extremely difficult for consumers.

As a conventional wireless communication pairing system, there has been a wireless communication pairing device implemented with the Wi-Fi Protected Setup (hereinafter, referred to as WPS) standard developed by the Wi-Fi Alliance as an industry group of the wireless LAN (for example, see "Wi-Fi Simple Configuration Technical Specification Version 2.0.2). In the WPS, two modes are defined. A first one is a mode called a push button type. Specifically, push buttons are previously provided in wireless communication pairing devices, and in a case of performing the pairing, the push buttons of two devices as targets are pushed at substantially the same time, whereby the pairing is performed. Moreover, a second mode is a mode called a PIN code type. Specifically, in either one of the wireless communication pairing devices, a personal identification number called a PIN code is generated or preset, and the PIN code is manually input to the other party-side wireless communication pairing device as the pairing target, whereby the pairing is performed.

SUMMARY

A wireless communication device of the present disclosure includes: a wireless communication circuit that receives a first wireless communication packet from a slave wireless communication device by using a first wireless communication mode, the first wireless communication packet including a second authentication key generated with a predetermined algorithm assuming a first authentication key as input information and a pairing request identifier that requests pairing; a pairing acceptor that accepts the wireless communication packet received by the wireless communication circuit; a reception circuit that directly receives a second wireless communication packet from a remote operation device with a second wireless communication mode different from the first wireless communication mode, the second wireless communication packet including a third authentication key and a pairing command identifier that commands pairing with the slave wireless communication device; a pairing command monitor that monitors whether or not the reception circuit has received the second wireless communication packet; and an authentication key determiner that determines whether or not the second authentication key extracted from the first wireless communication packet and the third authentication key extracted from the second wireless communication packet coincide with each other, wherein it is determined that the second authentication key and the third authentication key sent from the remote operation device coincide with each other in the authentication key determiner in a case where the third authentication key is generated with the same algorithm as the predetermined algorithm assuming the first authentication key as input information.

A wireless communication device of the present disclosure includes: an authentication key generator that generates a second authentication key with a predetermined algorithm assuming a first authentication key as input information; a pairing requester that generates a packet including the second authentication key and a pairing request identifier that requests pairing; a wireless communication circuit that transmits the generated packet to a master wireless communication device as a pairing target by using a first wireless communication mode; and a reception circuit that directly receives a second wireless communication packet from a remote operation device by using a second wireless communication mode different from the first wireless communication mode, wherein the first authentication key is included in the second wireless communication packet directly received from the remote operation device, and the first authentication key is generated in the remote operation device with the same algorithm as the predetermined algorithm.

A remote operation device of the present disclosure is a remote operation device that performs pairing between a master wireless communication device and a slave wireless communication device by a remote operation, the remote operation device including: a holder that holds input information; an authentication key generator that, in a case where a predetermined operation input is performed, outputs an authentication key newly generated with a predetermined algorithm assuming as an input the input information held in the holder; a packet generator that generates a packet including the new authentication key; an updater that updates the generated authentication key as new input information; and a transmission circuit that transmits the generated packet to the slave wireless communication device, wherein, in a case where the predetermined operation input is performed again, the authentication key generator generates a further authentication key with the predetermined algorithm assuming the held input information as an input, the packet generator newly generates a packet including the further authentication key, and the transmission circuit transmits the new packet to the master wireless communication device.

DETAILED DESCRIPTION

Figure 1:
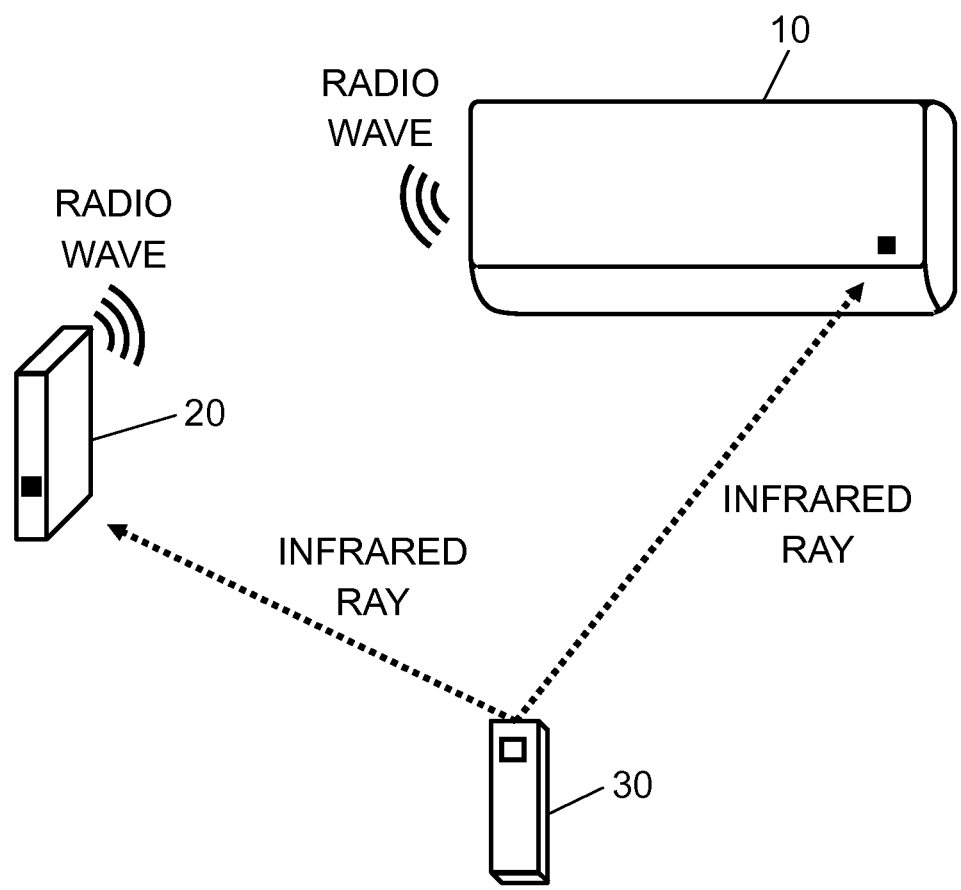
FIG. 1 is a configuration diagram of a wireless communication pairing system in a first exemplary embodiment.

Exemplary embodiments of the present disclosure simplify an initial setting of inter-device communication, that is, so-called inter-device pairing in a wireless communication device. In particular, the exemplary embodiments simplify pairing between electrical appliances, each of which has a wireless LAN or a specified low power radio network mounted thereon.

Though the push buttons are pushed at substantially the same time in the push button type of the conventional WPS, there is permitted some considerable degree of time difference. Accordingly, there has been a problem of vulnerability that a wireless communication pairing device of a malicious attacker may break in the pairing during that time to establish the pairing. Moreover, in a case where the wireless communication pairing device is applied to an electrical appliance, for example, to a room air conditioner or a lighting fixture, such an electrical appliance is installed in a vicinity of a ceiling, and accordingly, there has been a problem that to push the push button is troublesome work and is not necessarily a simple mode.

Moreover, in the PIN code type of the conventional WPS, it is necessary to prepare a user interface (hereinafter, referred to as UI), which is for inputting a PIN code, to at least either one of such wireless communication pairing devices, and it is necessary to connect thereto components such as some display device for confirming the input of the PIN code and some input device for inputting the PIN code or a personal computer for the UI, resulting in problems of cost increase and troublesome work. Moreover, there is a problem that the PIN code requires manually inputting a few digits of numbers, and accordingly is not necessarily a simple mode.

In accordance with the wireless communication device according to each of the exemplary embodiments of the present disclosure, pairing with a master wireless communication device or a slave wireless communication device can be securely performed by a remote operation through authentication by an authentication key from a remote operation device. For example, in a case where the slave wireless communication device (or the master wireless communication device) is incorporated in the electrical appliance installed in the vicinity of the ceiling, the pairing with the master wireless communication device (or the slave wireless communication device) can be simply performed by the remote operation.

A description is made below of the exemplary embodiments of the present disclosure while referring to the drawings.

First Exemplary Embodiment

FIG. 1 is a configuration diagram of a wireless communication pairing system in a first exemplary embodiment of the present disclosure.

In FIG. 1, reference numeral 10 denotes a slave device that requests pairing, for example, a room air conditioner or a lighting fixture, reference numeral 20 denotes a master device that responds to such a pairing request, for example, a wireless LAN access point or a wireless LAN router, and reference numeral 30 denotes a remote control device that an operator of the wireless communication pairing system holds with the hand to push a push button thereof and thereby executes the pairing.

Slave device 10 can be remotely operated when an operation input is performed while directing an infrared ray emitting portion (not shown) of remote control device 30 toward slave device 10. Moreover, master device 20 can be remotely operated when the operation input is performed while directing the infrared ray emitting portion (not shown) of remote control device 30 toward master device 20.

In FIG. 1, from remote control device 30 to slave device 10, for example, a packet (or a wireless communication packet) is transmitted by an infrared ray.

Moreover, from remote control device 30 to master device 20, for example, a packet (or a wireless communication packet) is transmitted by an infrared ray.

Furthermore, from slave device 10 to master device 20, for example, a packet (or a wireless communication packet) is transmitted by a radio wave.

Moreover, from master device 20 to slave device 10, for example, a packet (or a wireless communication packet) is transmitted by a radio wave.

(Configuration of Slave Device)

Figure 2:
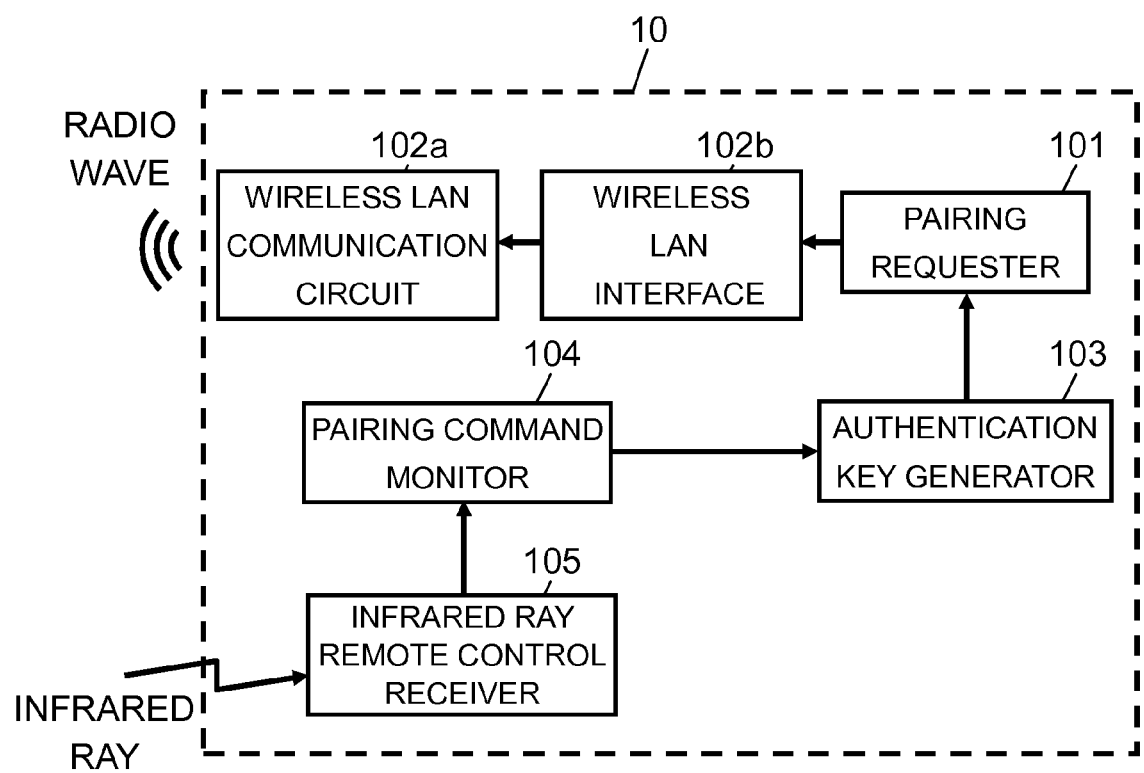
FIG. 2 is a configuration diagram of a slave device in the first exemplary embodiment.

FIG. 2 is a diagram for explaining an example of the slave device in the first exemplary embodiment of the present disclosure.

In FIG. 2, wireless LAN interface 102*b* is a wireless communication unit for forming a subnet by the pairing. For example, wireless LAN interface 102*b* controls wireless LAN communication circuit 102*a* so as to convert a packet (or referred to as a wireless communication packet), which corresponds to a pairing request received from pairing requester 101, into a signal, to modulate the signal, and to transmit the modulated signal through the radio wave. Wireless LAN communication circuit 102*a* receives a modulated signal included in the radio wave transmitted from master device 20. Wireless LAN interface 102*b* controls wireless LAN communication circuit 102*a* so as to demodulate the modulated signal transmitted by using the radio wave. Wireless LAN interface 102b takes out the wireless communication packet from the demodulated signal, and informs pairing requester 101 of the taken-out wireless communication packet.

Infrared ray remote control receiver 105 includes an infrared ray remote control reception circuit (not shown). Infrared ray remote control receiver 105 is a wireless communication unit for receiving a signal by using a communication mode having a communication distance shorter than a communication distance of the wireless LAN. For example, infrared ray remote control receiver 105 receives a modulated signal transmitted by using the infrared ray transmitted from remote control device 30, and informs pairing command monitor 104 of a wireless communication packet, which is taken out by demodulating the modulated signal thus received.

Pairing command monitor 104 monitors whether or not a pairing command identifier to be described later is included in the wireless communication packet from remote control device 30, which has been received from infrared ray remote control receiver 105.

Pairing command monitor 104 determines that the wireless communication packet is a pairing command in a case where the pairing command identifier to be described later is included in the wireless communication packet from remote control device 30. Then, pairing command monitor 104 extracts authentication key 1 included in this packet, and informs authentication key generator 103 of authentication key 1.

Authentication key generator 103 generates authentication key 2, which is a new authentication key, with such a key chain algorithm that generates authentication key 2 assuming as an input authentication key 1 received from pairing command monitor 104, and informs pairing requester 101 of authentication key 2. In a case of having received authentication key 2, which is the new authentication key, from authentication key generator 103, pairing requester 101 generates a wireless communication packet corresponding to a pairing request including authentication key 2, and informs wireless LAN interface 102b of the generated wireless communication packet. Wireless LAN interface 102b controls wireless LAN communication circuit 102a so as to convert the wireless communication packet, which corresponds to the pairing request, into a signal, to modulate the converted signal, and to transmit the modulated signal to master device 20.

After the pairing request is transmitted to master device 20, wireless LAN interface 102b receives a reception packet as a response to the request. In a case where data included in the reception packet is pairing authorization, wireless LAN interface 102b executes initial setting processing for performing communication, which uses the wireless LAN, with master device 20 based on the pairing authorization.

Pairing requester 101, wireless LAN interface 102b, authentication key generator 103, and pairing command monitor 104, which are mentioned above, are stored, for example, as programs in a storage (not shown) such as a memory. The respective functions of these are realized in such a manner that the programs are read out and are then executed by a central processing unit (or referred to as a CPU).

Moreover, in the storage, a program is stored for realizing a function to demodulate the received modulated signal in infrared ray remote control receiver 105 into the wireless communication packet from remote control device 30 and to inform pairing command monitor 104 of the demodulated wireless communication packet. Then, the program is read out from the storage, and a function corresponding to infrared ray remote control receiver 105 is realized.

The description has been made of an example where pairing requester 101, wireless LAN interface 102b, authentication key generator 103, pairing command monitor 104, and infrared ray remote control receiver 105, which are mentioned above, are individually the programs. However, the configuration is not necessarily limited thereto. For example, such a configuration may be adopted that any function or all functions of pairing requester 101, wireless LAN interface 102b, authentication key generator 103, pairing command monitor 104 and infrared ray remote control receiver 105 are realized by using dedicated signal processing circuits.

(Configuration of Master Device)

Figure 3:
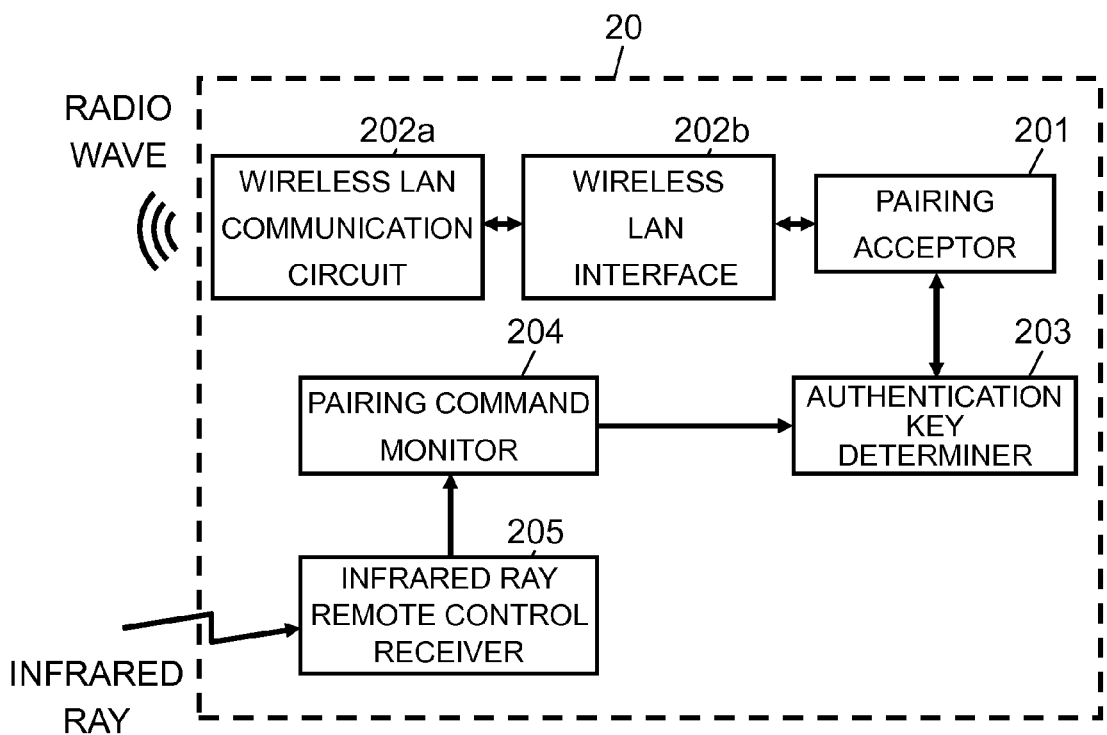
FIG. 3 is a configuration diagram of a master device in the first exemplary embodiment.

FIG. 3 is a configuration diagram of the master device in the first exemplary embodiment of the present disclosure.

In FIG. 3, wireless LAN interface 202b is a wireless communication unit for forming the subnet by the pairing. Wireless LAN interface 202b controls wireless LAN communication circuit 202a so as to receive the modulated signal transmitted from slave device 10 by using the radio wave, and to demodulate the modulated signal thus received. Wireless LAN interface 202b informs pairing acceptor 201 of the wireless communication packet, which is taken out from the demodulated signal.

In a case where the wireless communication packet received from wireless LAN interface 202b is a pairing request to be described later, pairing acceptor 201 extracts the authentication key included in this wireless communication packet, and informs authentication key determiner 203 of the extracted authentication key.

Infrared ray remote control receiver 205 includes an infrared ray remote control reception circuit (not shown), and is a wireless communication unit for receiving a signal by using the communication mode having a communication distance shorter than the communication distance of the wireless LAN. Infrared ray remote control receiver 205 receives the modulated signal transmitted by using the infrared ray transmitted from remote control device 30, and informs pairing command monitor 204 of the wireless communication packet, which is taken out by demodulating the modulated signal thus received.

In a case where the wireless communication packet from remote control device 30, which has been received from infrared ray remote control receiver 205, is a pairing command to be described later, pairing command monitor 204 extracts an authentication key included in this wireless communication packet, and informs authentication key determiner 203 of the extracted authentication key.

In a case where authentication key 2 received from pairing acceptor 201 and authentication key 2 received from pairing command monitor 204 coincide with each other as a result of comparison therebetween, authentication key determiner 203 informs pairing acceptor 201 of a pairing authorization notice, and in a case where authentication keys 2 do not coincide with each other, informs thereto of a pairing non-authorization notice.

Pairing acceptor 201 informs wireless LAN interface 202b of the pairing authorization/pairing non-authorization from authentication key determiner 203.

Wireless LAN interface 202b controls wireless LAN communication circuit 202a so as to modulate a packet, which includes data corresponding to the pairing authorization or pairing non-authorization received from pairing acceptor 201, into a wireless communication packet of the radio wave, and to transmit the modulated wireless communication packet.

Pairing acceptor 201, wireless LAN interface 202b, authentication key determiner 203, and pairing command monitor 204, which are mentioned above, are stored as programs in a storage (not shown) such as a memory. The respective functions of these are realized in such a manner that the programs are read out and are then executed by a central processing unit (or referred to as a CPU).

Moreover, in the storage, a program is stored for realizing a function to inform pairing command monitor 204 of the wireless communication packet, which is taken out by demodulating the modulated signal received by infrared ray remote control receiver 205. Then, the program is read out from storage 207, and a function corresponding to infrared ray remote control receiver 205 is realized.

The description has been made of an example where pairing acceptor 201, wireless LAN interface 202b, authentication key determiner 203, pairing command monitor 204, and infrared ray remote control receiver 205, which are mentioned above, are individually the programs. However, the configuration is not necessarily limited thereto. For example, such a configuration may be adopted that any function or all functions of pairing acceptor 201, wireless LAN interface 202b, authentication key determiner 203, pairing command monitor 204 and infrared ray remote control receiver 205 are realized by using dedicated signal processing circuits.

(Configuration of Remote Control Device)

Figure 4:
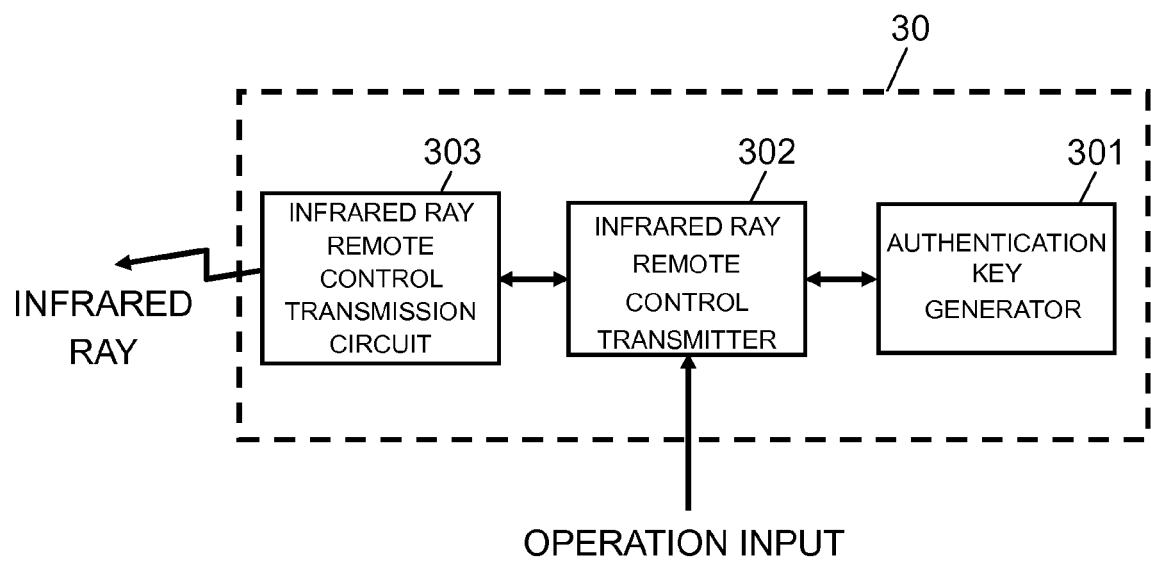
FIG. 4 is a configuration diagram of a remote control device in the first exemplary embodiment.

FIG. 4 is a configuration diagram of the remote control device in the first exemplary embodiment of the present disclosure.

In FIG. 4, in a case of having sensed that a signal for remotely controlling the pairing is received by the pushing of a predetermined push button and so on, infrared ray remote control transmitter 302 informs authentication key generator 301 of an authentication key generation request. Authentication key generator 301 holds an initial value of the authentication key. Moreover, in a case of having generated the authentication key before, authentication key generator 301 holds the authentication key generated immediately before (or the authentication key generated last time). Authentication key generator 301 generates the authentication key with a key chain algorithm. The key chain algorithm is an algorithm for generating a new authentication key by using the authentication key generated last time or the initial value of the authentication key. In a case of the same input, the same value is output.

In a case of generating the authentication key for the first time, authentication key generator 301 outputs the initial value of the authentication key to infrared ray remote control transmitter 302, and in a case of having generated the authentication key before, authentication key generator 301 outputs an authentication key, which is generated with the key chain algorithm assuming as an input the authentication key generated last time, to infrared ray remote control transmitter 302.

Infrared ray remote control transmitter 302 controls infrared ray remote control transmission circuit 303 so as to generate a wireless communication packet including the authentication key received from authentication key generator 301 and the pairing command identifier, to convert the generated wireless communication packet into a signal, to modulate the signal, and to transmit the modulated signal to slave device 10 or master device 20.

For example, when the predetermined push button is pushed in a state where remote control device 30 is directed toward slave device 10, the pairing command to slave device 10 is transmitted. Thereafter, when the predetermined push button is pushed again in a state where remote control device 30 is directed toward master device 20, the pairing command is transmitted to master device 20.

Figure 5:
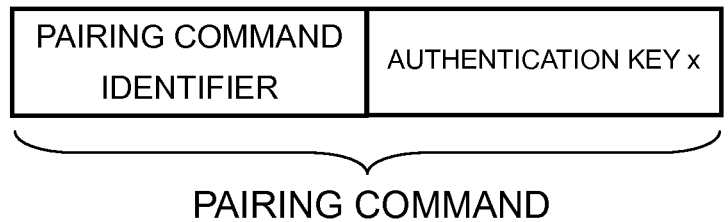
FIG. 5 is a view showing an example of a data structure of a packet corresponding to a pairing command in the first exemplary embodiment.

FIG. 5 is a view showing an example of a data structure of the wireless communication packet corresponding to the pairing command in the first exemplary embodiment of the present disclosure.

In FIG. 5, the packet corresponding to the pairing command is composed of: the pairing command identifier indicating that the packet is the pairing command; and an authentication key x. The authentication key x is generated with such a key chain algorithm that generates a new authentication key based on the authentication key generated last time by the authentication key generated every time the push button is pushed. The pairing command is a so-called message for communication.

Figure 6A:
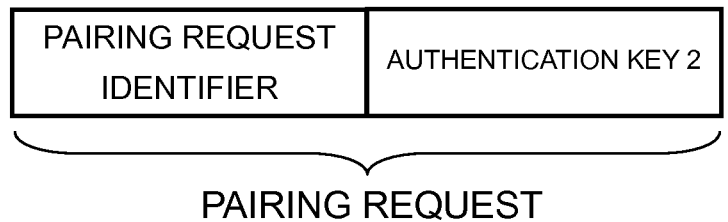
FIG. 6A is a view showing an example of a data structure of a packet corresponding to a pairing request in the first exemplary embodiment.

FIG. 6A is a view showing an example of a data structure of a packet corresponding to the pairing request in the first exemplary embodiment of the present disclosure.

In FIG. 6A, the packet corresponding to the pairing request is composed of: a pairing request identifier indicating that the packet is the pairing request; and authentication key 2. The pairing request is a so-called message for communication.

Figure 6B:
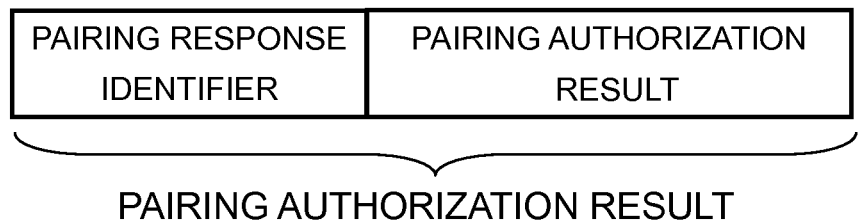
FIG. 6B is a view showing an example of a data structure of a packet corresponding to a pairing authorization result in the first exemplary embodiment.

FIG. 6B is a view showing an example of a data structure of a packet corresponding to a pairing authorization result in the first exemplary embodiment of the present disclosure.

In FIG. 6B, the packet corresponding to the pairing authorization result is composed of: a pairing response identifier indicating a response result to the pairing request; and a pairing authentication result indicating the pairing authorization or the pairing non-authorization. The pairing response is a so-called message for communication.

Figure 7:
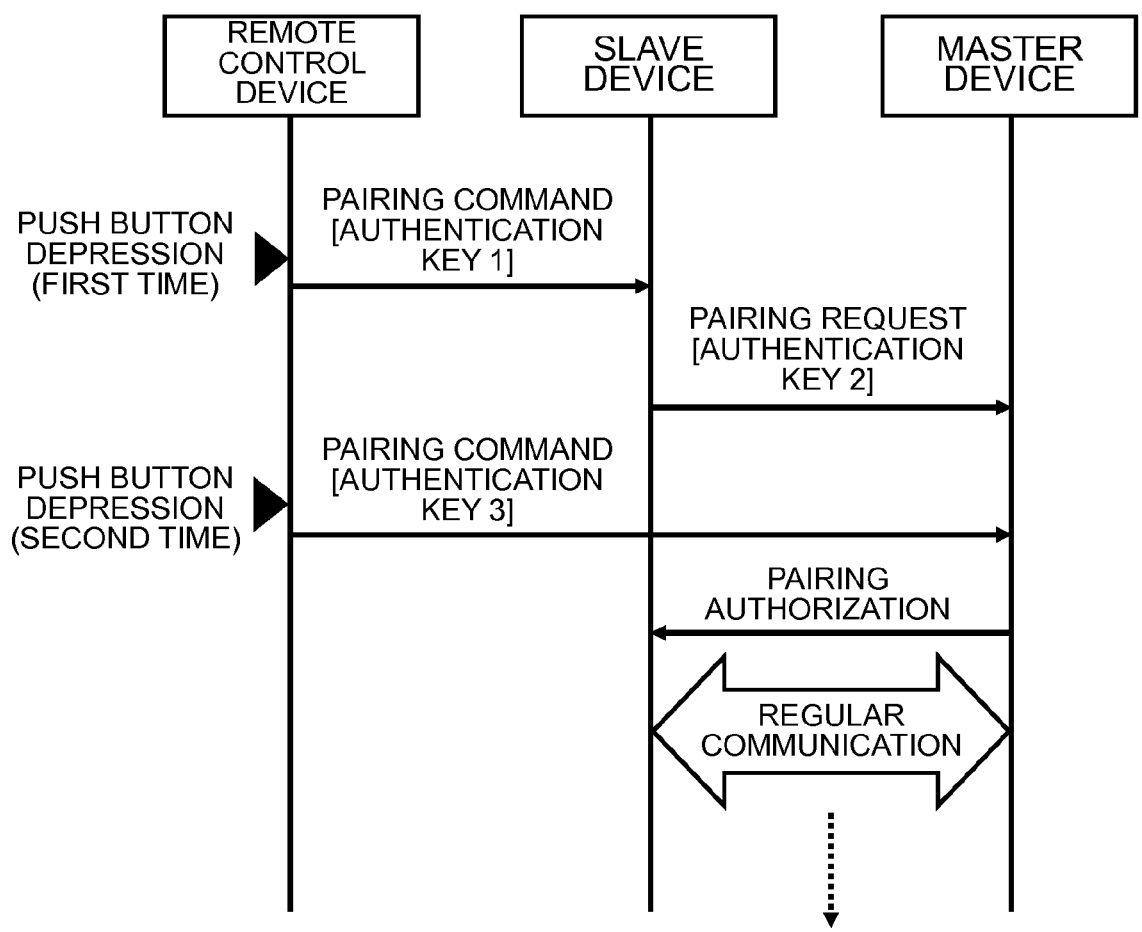
FIG. 7 is a chart showing transfers of instructions and responses between constituent elements of the wireless communication pairing system in the first exemplary embodiment.

FIG. 7 is a chart showing transfers of instructions and responses between constituent elements of the wireless communication pairing system in the first exemplary embodiment of the present disclosure.

Next, with reference to FIG. 7, a description is made of the transfers of the instructions and the responses between the constituent elements of the wireless communication pairing system in the first exemplary embodiment of the present disclosure.

When the push button is depressed (for the first time) in remote control device 30 while directing the infrared ray emitting portion toward slave 10, remote control device 30 generates a wireless communication packet corresponding to the pairing command including authentication key 1, converts the generated wireless communication packet into a signal, modulates the converted signal, and transmits the modulated signal to slave device 10 by using the infrared ray.

Slave device 10 extracts authentication key 1 from the pairing command. Subsequently, slave device 10 generates a new authentication key (in this example, authentication key 2) with the key chain algorithm assuming authentication key 1 as an input, generates a wireless communication packet including the generated new authentication key and the pairing request identifier, converts the generated wireless communication packet into a signal, modulates the converted signal, transmits the modulated signal to master device 20, and thereby issues a pairing request to master device 20. Master device 20 demodulates the modulated signal thus received, and extracts authentication key 2 from the wireless communication packet including the pairing request identifier.

Moreover, when the push button is depressed (for the second time) in remote control device 30 while directing the infrared ray emitting portion toward master device 20, remote control device 30 generates a wireless communication packet including an authentication key (authentication key 3 in this example) newly generated with the key chain algorithm assuming authentication key 1 as an input and the pairing command identifier, converts the generated wireless communication packet into a signal, modulates the converted signal, transmits the modulated signal to master device 20, and thereby issues a pairing command to master device 20.

Note that the key chain algorithm that generates the authentication key in remote control device 30 and the key chain algorithm that generates the authentication key in slave device 10 are the same algorithm.

The key chain algorithms in remote control device 30 and slave device 10 output the same value (pseudo-random number as the authentication key) if respective inputs are the same value.

In the example of FIG. 7, a case is assumed, where the push button of remote control device 30 is not depressed during a period from when the push button is depressed in remote control device 30 while directing the infrared ray light emitting portion toward slave device 10 until when the push button is depressed while directing the infrared ray light emitting portion toward master device 20. In this case, it is input key 1 that is input to the key chain algorithm of remote control device 30 in a case where the push button is depressed for the second time in remote control device 30 and the new authentication key is created. Then, in slave device 10, it is the input key 1 that is input to the key chain algorithm of slave device 10 in a case where the pairing command including authentication key 1 is received and the new authentication key is generated. Hence, in this case, authentication key 2 included in the pairing request transmitted from slave device 10 to master device 20 and authentication key 3 included in the pairing command transmitted from remote control device 30 to master device 20 take the same value.

However, it is assumed that, for example, the push button of remote control device 30 is depressed once owing to an erroneous operation during the period from when the push button is depressed in remote control device 30 while directing the infrared ray light emitting portion toward slave device 10 until when the push button is depressed while directing the infrared ray light emitting portion toward master device 20. In this case, when the push button of remote control device 30 is depressed once owing to the erroneous operation, then assuming authentication key 1 as an input, a new authentication key is generated with the key chain algorithm of remote control device 30. This new authentication key is different from authentication key 1. Hence, in a case of generating a further authentication key by the depression of the push button in remote control device 30 while directing the infrared ray emitting portion toward master device 20, an input to the key chain algorithm of remote control device 30 is different from the input key 1. Hence, in this case, authentication key 2 included in the pairing request transmitted from slave device 10 to master device 20 and authentication key 3 included in the pairing command transmitted from remote control device 30 to master device 20 take different values. Master device 20 demodulates the modulated signal by the infrared ray, and extracts authentication key 3 from the wireless communication packet including the pairing command identifier. Subsequently, master device 20 compares authentication key 2, which is extracted from the previous pairing request, and authentication key 3, which is extracted from the subsequent pairing command, with each other. Then, in a case where authentication keys 2 and 3 coincide with each other as a result of the comparison, master device 2 generates a packet including the pairing authorization and the pairing response identifier, converts the generated wireless communication packet into a signal, modulates the converted signal, and transmits the modulated signal to slave device 10. Meanwhile, in a case where authentication keys 2 and 3 do not coincide with each other as a result of the comparison, master device 20 generates a packet including the pairing non-authorization and the pairing response identifier, converts the generated wireless communication packet into a signal, modulates the converted signal, and transmits the modulated signal to slave device 10.

In a case of having received the packet including the pairing authorization, then based on the pairing authorization, slave device 10 performs an initial setting for performing communication with master device 20 by using the wireless LAN, whereby the wireless communication pairing is completed.

Thereafter, for the communication, slave device 10 and master device 20 use the wireless LAN as a regular communication unit.

Figure 8:
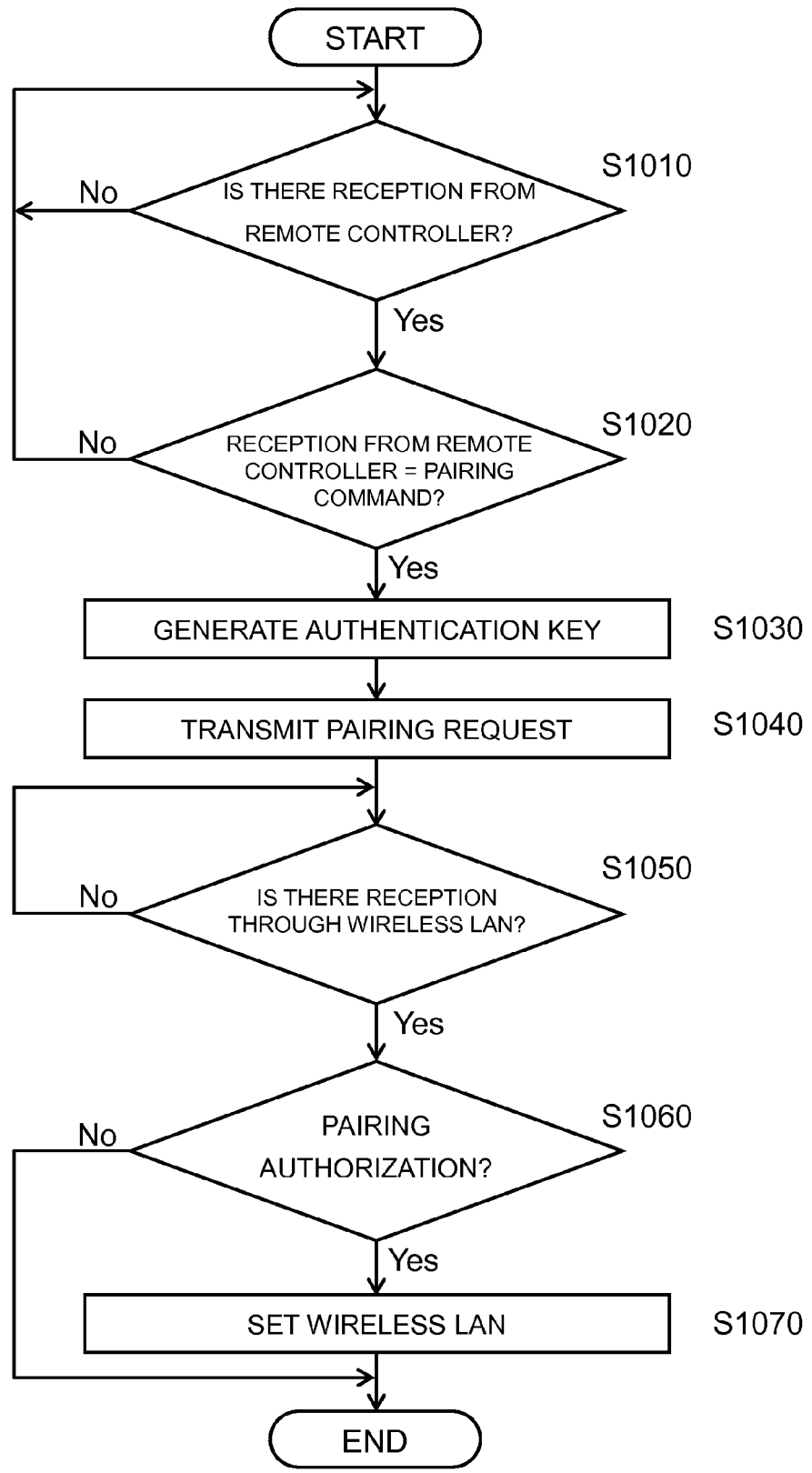
FIG. 8 is a flowchart showing a flow of operations of the slave device in the first exemplary embodiment.

FIG. 8 is a flowchart showing a flow of operations of slave device 10 in the first exemplary embodiment of the present disclosure.

Next, with reference to FIG. 8, a description is made of the flow of the operations of slave device 10 in the first exemplary embodiment of the present disclosure.

Infrared ray remote control receiver 105 waits for reception of the modulated signal transmitted from remote control device 30 by using the infrared ray. Upon receiving the modulated signal, infrared ray remote control reception circuit 105a informs pairing command monitor 104 of the wireless communication packet, which is taken out by demodulating the modulated signal (S1010).

In a case where the wireless communication packet received from infrared ray remote control receiver 105 includes the pairing command identifier, then pairing command monitor 104 determines that the wireless communication packet is the wireless communication packet corresponding to the pairing command, extracts authentication key 1 from this wireless communication packet, informs authentication key generator 103 of authentication key 1, and proceeds to S1030, and otherwise, proceeds to S1010 (S1020).

Authentication key generator 103 calculates authentication key 2 based on authentication key 1 received from pairing command monitor 104, and informs pairing requester 101 of authentication key 2 (S1030).

Pairing requester 101 generates the wireless communication packet including the authentication key newly generated in the case of having received the newly generated authentication key (authentication key 2 in this example) from authentication key generator 103 and the pairing request identifier. Pairing requester 101 informs wireless LAN interface 102b of the generated wireless communication packet. The wireless LAN interface 102b converts the wireless communication packet, which is received from pairing requester 101, into a signal, modulates the converted signal, transmits the modulated signal to master device 20, and thereby makes the pairing request to master device 20 (S1040).

Wireless LAN interface 102b waits for reception of the modulated signal corresponding to the wireless communication packet, as a response result to the pairing request transmitted from master device 20. Upon receiving the modulated signal through wireless LAN communication circuit 102a, wireless LAN interface 102b informs pairing requester 101 of the wireless communication packet, which is taken out by demodulating the modulated signal (S1050).

Pairing requester 101 proceeds to S1070 in the case where the wireless communication packet received from wireless LAN interface 102b is the pairing authorization, and otherwise, proceeds to END (S1060).

Pairing requester 101 sets the wireless LAN based on the pairing authorization (S1070).

Figure 9:
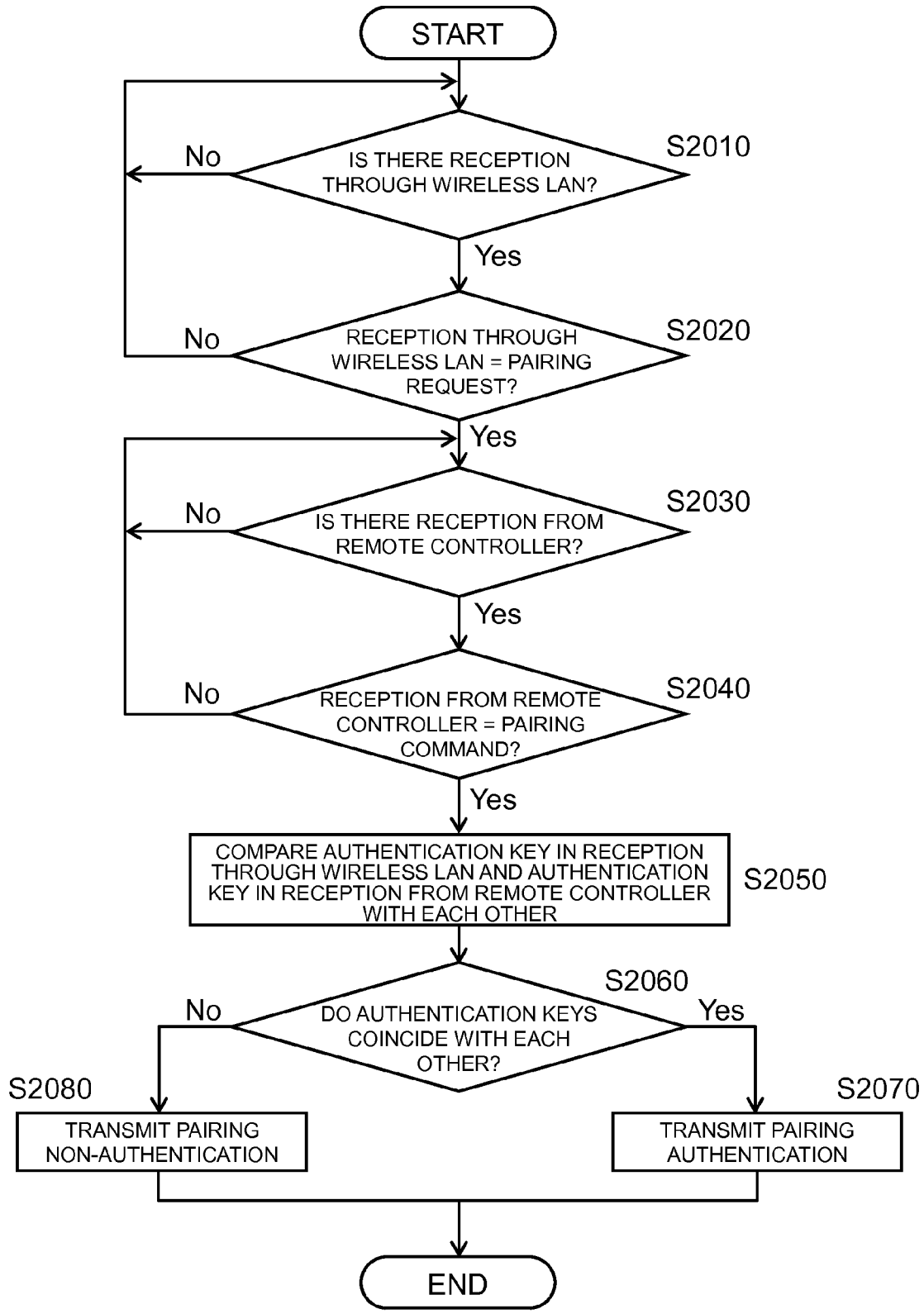
FIG. 9 is a flowchart showing a flow of operations of the master device in the first exemplary embodiment.

FIG. 9 is a flowchart showing a flow of operations of master device 20 in the first exemplary embodiment of the present disclosure.

Next, with reference to FIG. 9, a description is made of the flow of the operations of master device 20 in the first exemplary embodiment of the present disclosure.

Wireless LAN interface 202b waits for reception of the modulated signal transmitted from slave device 10. Upon receiving the modulated signal from slave device 10, wireless LAN communication circuit 202a informs pairing acceptor 201 of the wireless communication packet, which is taken out by demodulating the modulated signal (S2010).

In a case where the wireless communication packet received from wireless LAN interface 202b includes the pairing request identifier, then pairing acceptor 201 extracts authentication key 2 from this wireless communication packet, informs authentication key determiner 203 of authentication key 2, and proceeds to S2030, and otherwise, proceeds to S2010 (S2020).

Infrared ray remote control receiver 205 waits for reception of the modulated signal transmitted from remote control device 30. Upon receiving the modulated signal from remote control device 30, infrared ray remote control reception circuit 205a informs pairing command monitor 204 of the wireless communication packet, which is taken out by demodulating the modulated signal (S2030).

In a case where the wireless communication packet received from infrared ray remote control receiver 205 includes the pairing command identifier, pairing command monitor 204 extracts authentication key 3 from this wireless communication packet, informs authentication key determiner 203 of authentication key 3, and proceeds to S2050, and otherwise, proceeds to S2020 (S2040).

Authentication key determiner 203 compares authentication key 2, which is received from pairing acceptor 201, and authentication key 3, which is received from pairing command monitor 204, with each other (S2050).

In the case where authentication key 2 and authentication key 3 coincide with each other as a result of the comparison, authentication key determiner 203 proceeds to S2070, and otherwise, proceeds to S2080 (S2060).

Authentication key determiner 203 informs pairing acceptor 201 of an authentication key coincidence notice, and upon receiving the authentication key coincidence notice, pairing acceptor 201 generates the wireless communication packet including the pairing authorization and the pairing response identifier, and informs wireless LAN interface 202b of the generated wireless communication packet. Then, wireless LAN interface 202b converts the wireless communication packet, which is received from pairing acceptor 201, into a signal, modulates the converted signal, and transmits the modulated signal (S2070).

Authentication key determiner 203 informs pairing acceptor 201 of an authentication key inconsistency notice. Upon receiving the authentication key inconsistency notice, pairing acceptor 201 generates the wireless communication packet including the pairing non-authorization and the pairing response identifier, and informs wireless LAN interface 202b of the generated wireless communication packet. Wireless LAN interface 202b converts the wireless communication packet, which is received from pairing acceptor 201, into a signal, modulates the converted signal, and transmits the modulated signal (S2080).

Figure 10:
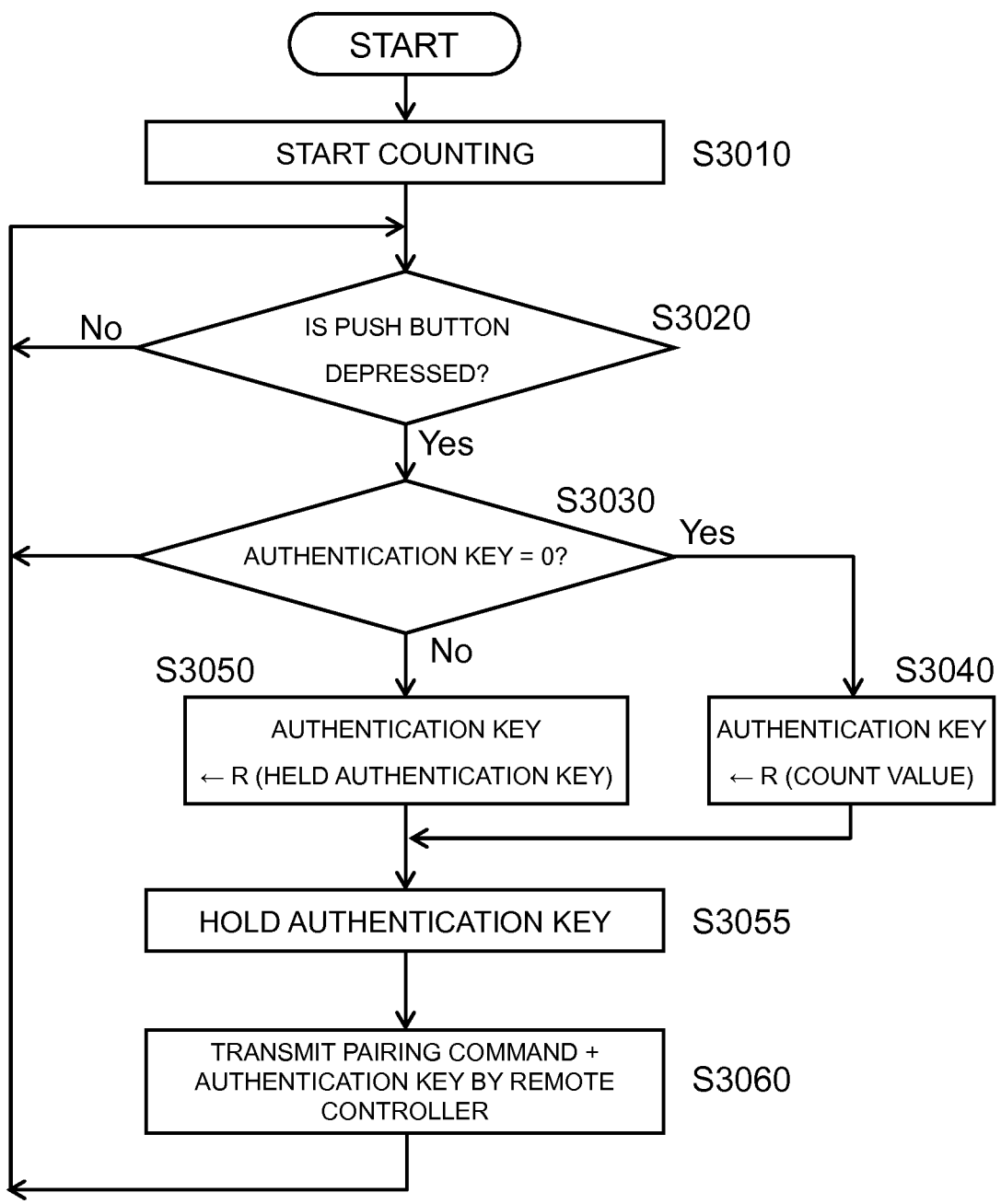
FIG. 10 is a flowchart showing a flow of operations of the remote control device in the first exemplary embodiment.

FIG. 10 is a flowchart showing a flow of operations of remote control device 30 in the first exemplary embodiment of the present disclosure.

Next, with reference to FIG. 10, a description is made of the flow of the operations of remote control device 30 in the first exemplary embodiment of the present disclosure.

By resetting when a battery is inserted, remote control device 30 initializes the authentication key and a counter to zero, and starts an operation of the counter (S3010).

Infrared ray remote control transmitter 302 waits for the predetermined push button to be depressed. In the case where the predetermined push button is depressed, infrared ray remote control transmitter 302 informs authentication key generator 301 of the authentication key generation request (S3020).

Upon receiving the authentication key generation request, authentication key generator 301 determines whether or not the received authentication key generation request is a first authentication key generation request made after the resetting. Specifically, authentication key generator 301 determines whether or not a value of the authentication key is zero, proceeds to S3040 in a case where the value of the authentication key is zero, and otherwise, proceeds to S3050 (S3030).

In S3040, authentication key generator 301 outputs, as the authentication key, a value generated with the key chain algorithm assuming a count value of the counter as an input.

In Step S3050, authentication key generator 301 outputs, as an authentication key of this time, an authentication key newly generated with the key chain algorithm assuming the authentication key having a value which is not zero, as an input. The authentication key generated with the key chain algorithm is output with the value which is not zero. In S3055, authentication key generator 301 holds the authentication key output this time. The held authentication key is used for determination in S3030, which will be performed next time (S3040).

The key chain algorithm is an algorithm for generating a pseudo-random number. For example, a function R(x) is a function for generating the pseudo-random number assuming x as an input.

Authentication key generator 301 generates a new authentication key by R (authentication key), and informs infrared ray remote control transmitter 302 of the generated authentication key. By this arithmetic operation, authentication key generator 301 chains the authentication keys with each other (S3050).

The infrared ray remote control transmitter 302 generates the wireless communication packet including the pairing command, which includes the authentication key received from the authentication key generator 301, converts the generated wireless communication packet into a signal, modulates the converted signal, and transmits the modulated signal by using the infrared ray.

In this exemplary embodiment, the generation algorithms of the authentication keys in authentication key generator 103 provided in slave device 10 and authentication key generator 301 provided in remote control device 30 are the same.

Hence, the authentication key, which is generated by authentication key generator 103 assuming as an input authentication key 1 included in the pairing command packet sent from remote control device 30 to slave device 10 through the infrared ray, and the authentication key, which is generated by authentication key generator 301 assuming authentication key 1 as an input in remote control device 30, become the same.

Hence, in remote control device 30, after authentication key 1 is transmitted to slave device 10, the new authentication key generated by authentication key generator 301 assuming authentication key 1 as an input is sent to master device 20. In this way, in master device 20, it becomes possible to determine the authentication key, which is sent from slave device 10, by using the authentication key sent from remote control device 30.

This means that, by the remote operation using remote control device 30, it becomes possible to perform transmission/reception of the necessary information for the authentication operation in the case of wirelessly connecting master device 20 and slave device 10 to each other.

In accordance with such a configuration, for example, even in a case where slave device 10 is an electrical appliance such as a room air conditioner and a lighting fixture, which is installed at a relatively high position (vicinity of a ceiling) in a room, remote control device 30 is operated, whereby the pairing between slave device 10 and master device 20 can be performed by using the authentication key transmitted to slave device 10 and master device 20.

That is to say, by the remote operation using remote control device 30, it becomes possible to perform the pairing between slave device 10 and master device 20.

This eliminates the need for performing individually on slave device 10 and master device 20 a direct operation like the push button type of the WPS, for example, a direct operation of substantially simultaneously pushing the push buttons, which are provided in slave device 10 and master device 20 for the purpose of performing the pairing therebetween.

Moreover, unlike the PIN code type of the WPS, it is not necessary to prepare a user interface (hereinafter, referred to as UI) for inputting the PIN code to either one of slave device 10 or master device 20.

Second Exemplary Embodiment

With regard to the same functions and operations as those of the first exemplary embodiment, a description is omitted, and different points from the first exemplary embodiment are described. However, FIG. 2, FIG. 3 and FIG. 8 are referred to for the purpose of describing the different points.

Different points of slave device 10 in a second exemplary embodiment of the present disclosure from that in the first exemplary embodiment are as follows.

In FIG. 2, in addition to newly generating an authentication key 2 with a key chain algorithm assuming as an input authentication key 1 received from pairing command monitor 104, authentication key generator 103 newly generates an authentication key 3 with the key chain algorithm assuming authentication key 2 as an input. The authentication key generator 103 defines a plurality of the newly generated authentication keys (authentication key 2 and authentication key 3 in this example) as an authentication key sequence, and informs pairing requester 101 of this authentication key sequence.

In a case of having received the authentication key sequence from authentication key generator 103, pairing requester 101 generates a wireless communication packet corresponding to a pairing request including the authentication key sequence and a pairing request identifier, and informs wireless LAN interface 102b of the generated wireless communication packet.

In a case where a first reception packet received from wireless LAN interface 102b is pairing authorization, the pairing is established based on the pairing authorization (different point of the slave device of the second exemplary embodiment from that of the first exemplary embodiment).

Different points of master device 20 in the second exemplary embodiment of the present disclosure from that in the first exemplary embodiment are as follows.

In FIG. 3, in the case where the wireless communication packet received from wireless LAN interface 202b is the pairing request (that is, the case where the wireless communication packet from a wireless LAN includes the pairing request identifier), pairing acceptor 201 extracts the authentication key sequence from the wireless communication packet corresponding to the pairing request, and informs authentication key determiner 203 of the extracted authentication key sequence.

In the case where the wireless communication packet from remote control device 30, which has been received from infrared ray remote control receiver 205, is a pairing command (that is, the case where the reception packet from the wireless LAN includes a pairing command identifier), pairing command monitor 204 extracts an authentication key x from the wireless communication packet corresponding to the pairing command, and informs authentication key determiner 203 of the extracted authentication key x.

In a case where any of the plurality of authentication keys included in the received authentication key sequence and the authentication key x received from pairing command monitor 204 coincide with each other, authentication key determiner 203 informs pairing acceptor 201 of a pairing authorization notice, and in a case where any authentication key included in the authentication key sequence and the authentication key x do not coincide with each other, informs pairing acceptor 201 of a pairing non-authorization notice.

Operations of remote control device 30 in the second exemplary embodiment of the present disclosure are the same as those of the first exemplary embodiment, and a description thereof is omitted here.

Figure 11:
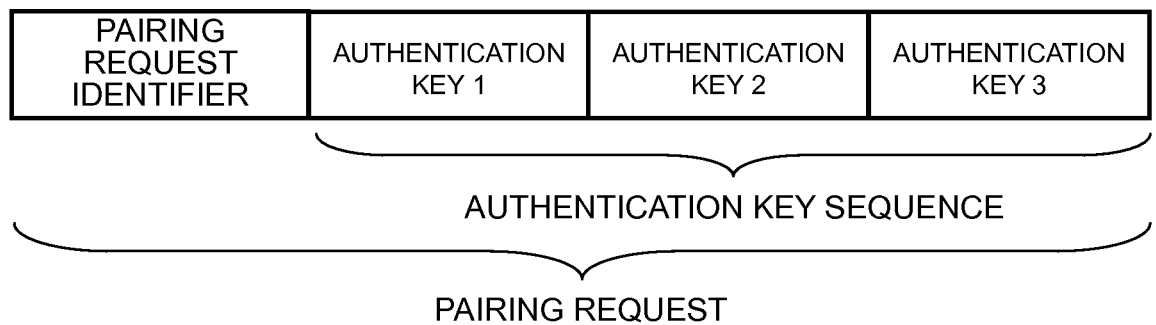
FIG. 11 is a view showing an example of a data structure of a packet corresponding to a pairing request in a second exemplary embodiment.

FIG. 11 is a view showing an example of a data structure of the packet corresponding to the pairing request in the second exemplary embodiment of the present disclosure.

In FIG. 11, the packet corresponding to the pairing request is composed of the pairing request identifier and the authentication key sequence.

A first authentication key (authentication key 1 in this example) included in the authentication key sequence is the authentication key included in the reception packet received from remote control device 30.

A second authentication key (authentication key 2 in this example) included in the authentication key sequence is the authentication key generated with the key chain algorithm assuming authentication key 1 as an input.

A third authentication key (authentication key 3 in this example) included in the authentication key sequence is the authentication key generated with the key chain algorithm assuming authentication key 2 as an input. The above-mentioned operations are repeated, whereby four or more authentication keys can be included in the packet corresponding to the pairing request.

Note that the first authentication key included in the authentication key sequence is used only for generating the second authentication key in slave device 10, and it is not necessarily required to include the first authentication key in the authentication key sequence if the first authentication key is not used for the authentication in master device 20.

In FIG. 11, the description is made of, by way of example, three authentication keys as the plurality of authentication keys included in the authentication key sequence; however, the authentication key sequence is not necessarily limited thereto and just needs to include two or more authentication keys in consideration of matters such as up to how many number of times of the erroneous operation of depressing a push button in the remote control device is permitted.

The pairing request is a so-called message for communication, and is modulated into the wireless communication packet of a radio wave to be transmitted.

Figure 12:
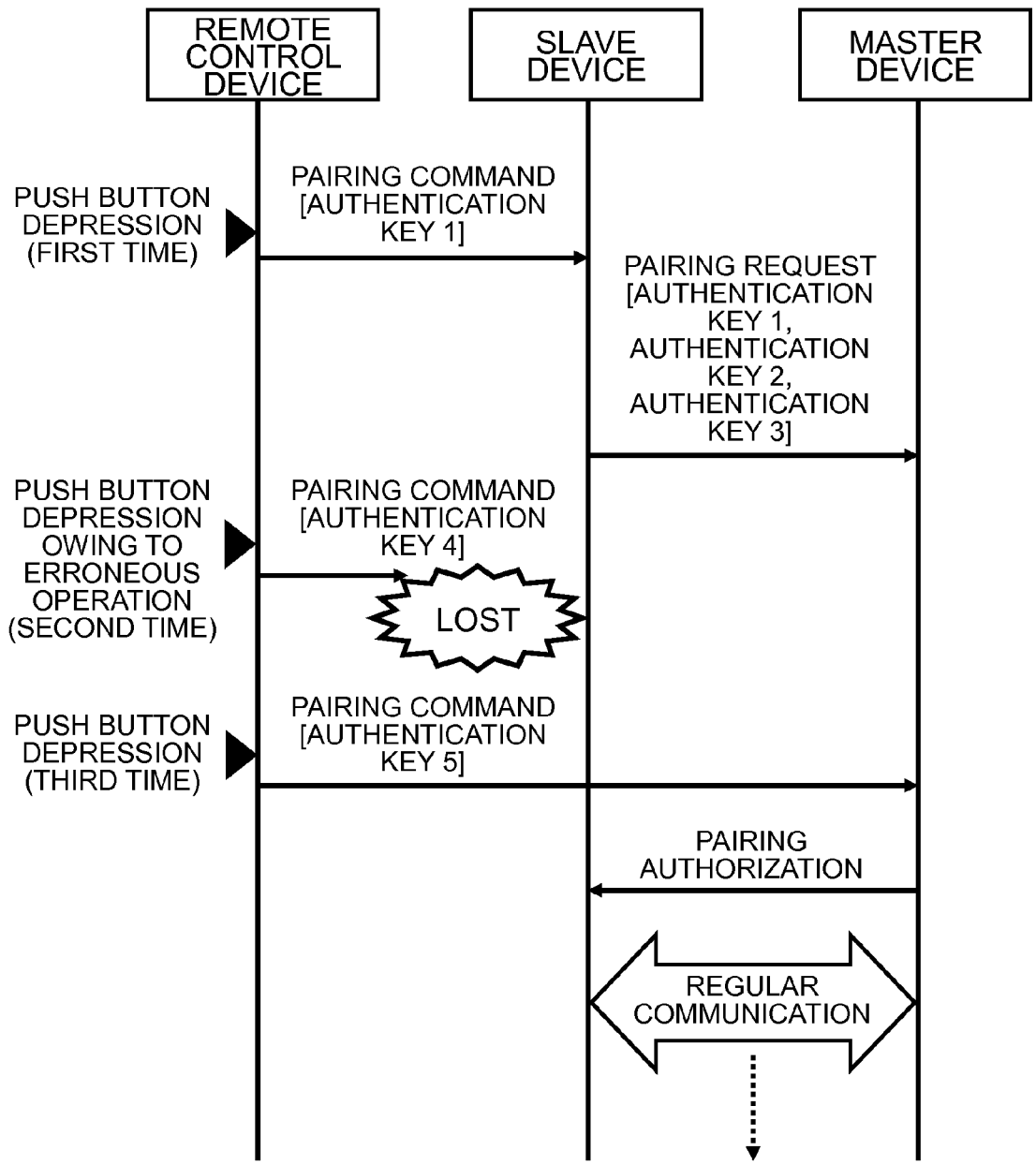
FIG. 12 is a first chart showing transfers of instructions and responses between constituent elements of a wireless communication pairing system in the second exemplary embodiment.

FIG. 12 is a first chart showing transfers of instructions and responses between constituent elements of a wireless communication pairing system in the second exemplary embodiment of the present disclosure.

Next, with reference to FIG. 12, a description is made of the transfers of the instructions and the responses between the constituent elements of the wireless communication pairing system in the second exemplary embodiment of the present disclosure.

When the push button is depressed (for the first time) in remote control device 30 while directing an infrared ray emitting portion toward slave 10, remote control device 30 generates the wireless communication packet corresponding to the pairing command including authentication key 1, converts the generated wireless communication packet into a signal, modulates the converted signal, and transmits the modulated signal to slave device 10 by using an infrared ray.

Slave device 10 extracts authentication key 1 from the received wireless communication packet including the pairing command. Subsequently, slave device 10 generates the authentication key sequence based on authentication key 1, generates the wireless communication packet corresponding to the pairing request including the authentication key sequence, converts the generated wireless communication packet into a signal, modulates the converted signal, and transmits the modulated signal to master device 20. Note that FIG. 12 exemplifies the case where the authentication key sequence includes authentication key 1 to authentication key 3; however, the authentication key sequence may include an arbitrary number of the authentication keys, which is calculated in a chain-like fashion starting from authentication key 1.

In a case where the received packet is the pairing request, master device 20 extracts the authentication key sequence from the wireless communication packet corresponding to the pairing request.

A case is considered where, in remote control device 30, the push button is depressed (for the second time) when the infrared ray emitting portion is directed in the unrelated direction owing to the erroneous operation or when the remote control device is carried about while being put in a pocket of clothes. At this time, remote control device 30 is not directed to master device 20. Hence, though the wireless communication packet corresponding to the pairing command including an authentication key 4 is transmitted from remote control device 30 by using the infrared ray, master device 20 loses the wireless communication packet without receiving the same.

When the push button is depressed (for the third time) in remote control device 30 while directing the infrared ray emitting portion toward master device 20, remote control device 30 generates a wireless communication packet corresponding to a pairing command including an authentication key 5, converts the generated wireless communication packet into a signal, modulates the converted signal, and transmits the modulated signal to master device 20 by using the infrared ray.

Master device 20 extracts authentication key 5 from the pairing command received from remote control device 30. Subsequently, master device 20 compares the authentication key sequence, which is extracted from the previous pairing request, and authentication key 5, which is extracted from the subsequent pairing command, with each other. Then, in a case where any of the plurality of the authentication keys included in the authentication key sequence and authentication key 5 coincide with each other, master device 20 modulates the pairing authorization into the communication packet of the radio wave, and transmits the modulated communication packet to slave device 10, and in a case where any authentication key included in the authentication key sequence and authentication key 5 do not coincide with each other, master device 20 modulates the pairing non-authorization into the communication packet of the radio wave, and transmits the modulated communication packet to slave 10.

In a case of having received the pairing authorization, slave device 10 performs an initial setting of the wireless LAN communication based on the pairing authorization, and the wireless communication pairing is completed.

Thereafter, for the communication, slave device 10 and master device 20 use the wireless LAN as a regular communication unit.

Figure 13:
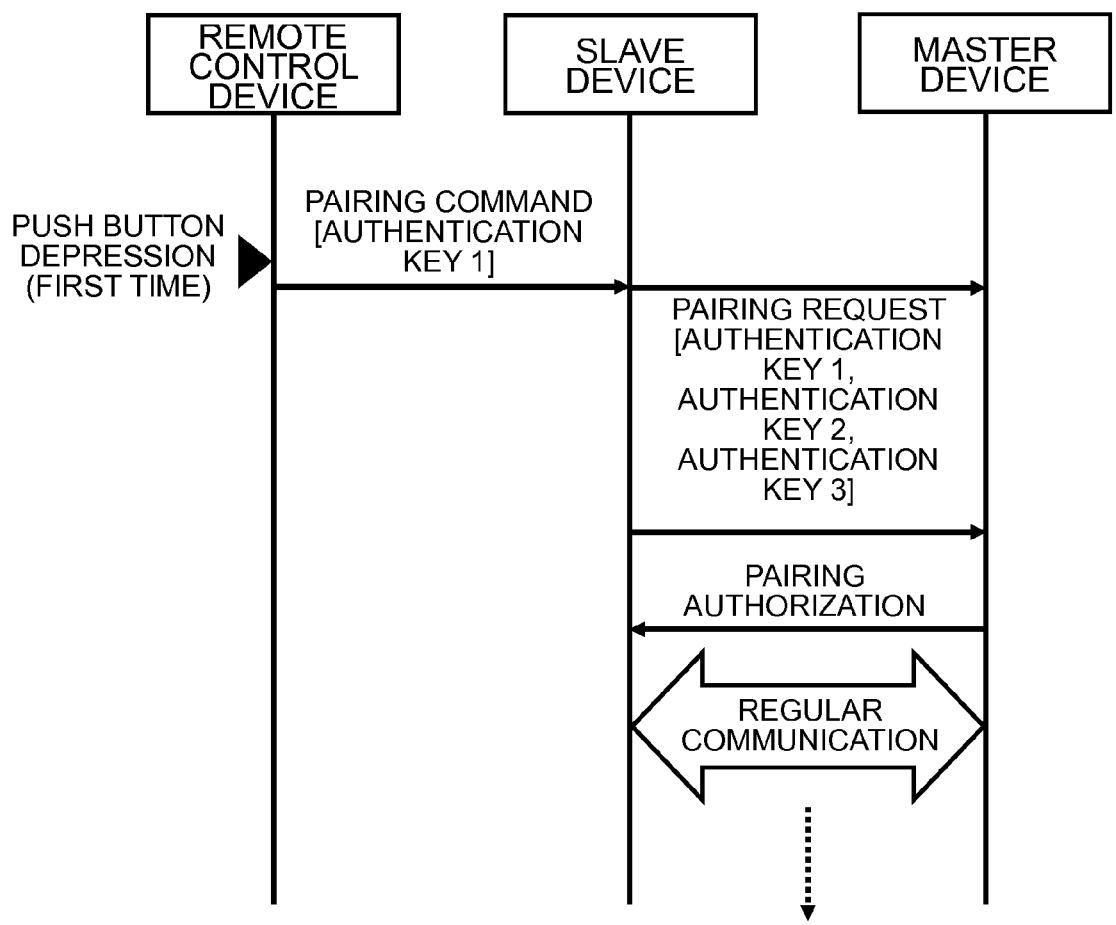
FIG. 13 is a second chart showing transfers of instructions and responses between constituent elements of the wireless communication pairing system in the second exemplary embodiment.

FIG. 13 is a second chart showing the transfers of the instructions and the responses between the constituent elements of the wireless communication pairing system in the second exemplary embodiment.

Next, with reference to FIG. 13, a description is made of the transfers of the instructions and the responses between the constituent elements of the wireless communication pairing system in the second exemplary embodiment.

For example, it is assumed that three devices, which are slave device 10, master device 20 and remote control device 30, are present in the same room, and the infrared ray emitting portion of remote control device 30 is designed to be omnidirectional.

When the push button is depressed (for the first time) in remote control device 30, remote control device 30 modulates the pairing command, which includes authentication key 1, into a communication packet of the infrared ray, and transmits the modulated communication packet to slave device 10 and master device 20.

Master device 20 extracts authentication key 1 from the wireless communication packet corresponding to the received pairing command.

Slave device 10 extracts authentication key 1 from the wireless communication packet corresponding to the received pairing command. Subsequently, based on authentication key 1, slave device 10 calculates the authentication key sequence, generates the wireless communication packet corresponding to the pairing request including the authentication key sequence, converts the generated wireless communication packet into a signal, modulates the converted signal, and transmits the modulated signal to master device 20. Note that FIG. 13 exemplifies the case where the authentication key sequence includes authentication key 1 to authentication key 3; however, the authentication key sequence may include an arbitrary number of the authentication keys, which is calculated in a chain-like fashion starting from authentication key 1.

Master device 20 extracts the authentication key sequence from the wireless communication packet corresponding to the received pairing request. Subsequently, master device 20 compares the authentication key sequence, which is extracted from the wireless communication packet corresponding to the pairing request, and authentication key 1, which is extracted from the wireless communication packet corresponding to the previous pairing command, with each other. Then, in the case where any authentication key in the authentication key sequence and authentication key 1 coincide with each other, master device 20 generates the wireless communication packet corresponding to the pairing authorization, converts the generated wireless communication packet into a signal, modulates the converted signal and transmits the modulated signal to slave device 10, and in a case where any authentication key in the authentication key sequence and authentication key 1 do not coincide with each other, master device 20 modulates the pairing non-authorization to the communication packet of the radio wave, and transmits the modulated communication packet to slave device 10.

In the case of having received the wireless communication packet corresponding to the pairing authorization, then based on the pairing authorization, slave device 10 performs an initial setting of the wireless LAN communication, whereby the wireless communication pairing is completed.

Thereafter, for the communication, slave device 10 and master device 20 use the wireless LAN as a regular communication unit.

Next, with reference to FIG. 8, a description is made of different points of the flow of the operations of slave device 10 in the second exemplary embodiment of the present disclosure from that in the first exemplary embodiment.

Based on authentication key 1 received from pairing command monitor 104, authentication key generator 103 calculates the authentication key sequence, and informs pairing requester 101 of the calculated authentication key sequence (S1030).

In the case of having received the authentication key sequence from authentication key generator 103, pairing requester 101 informs wireless LAN interface 102b of the wireless communication packet, which corresponds to the pairing request including the authentication key sequence, and wireless LAN interface 102b converts the wireless communication packet, which corresponds to the pairing request received from pairing requester 101, into a signal, modulates the converted signal, and transmits the modulated signal (S1040).

Figure 14:
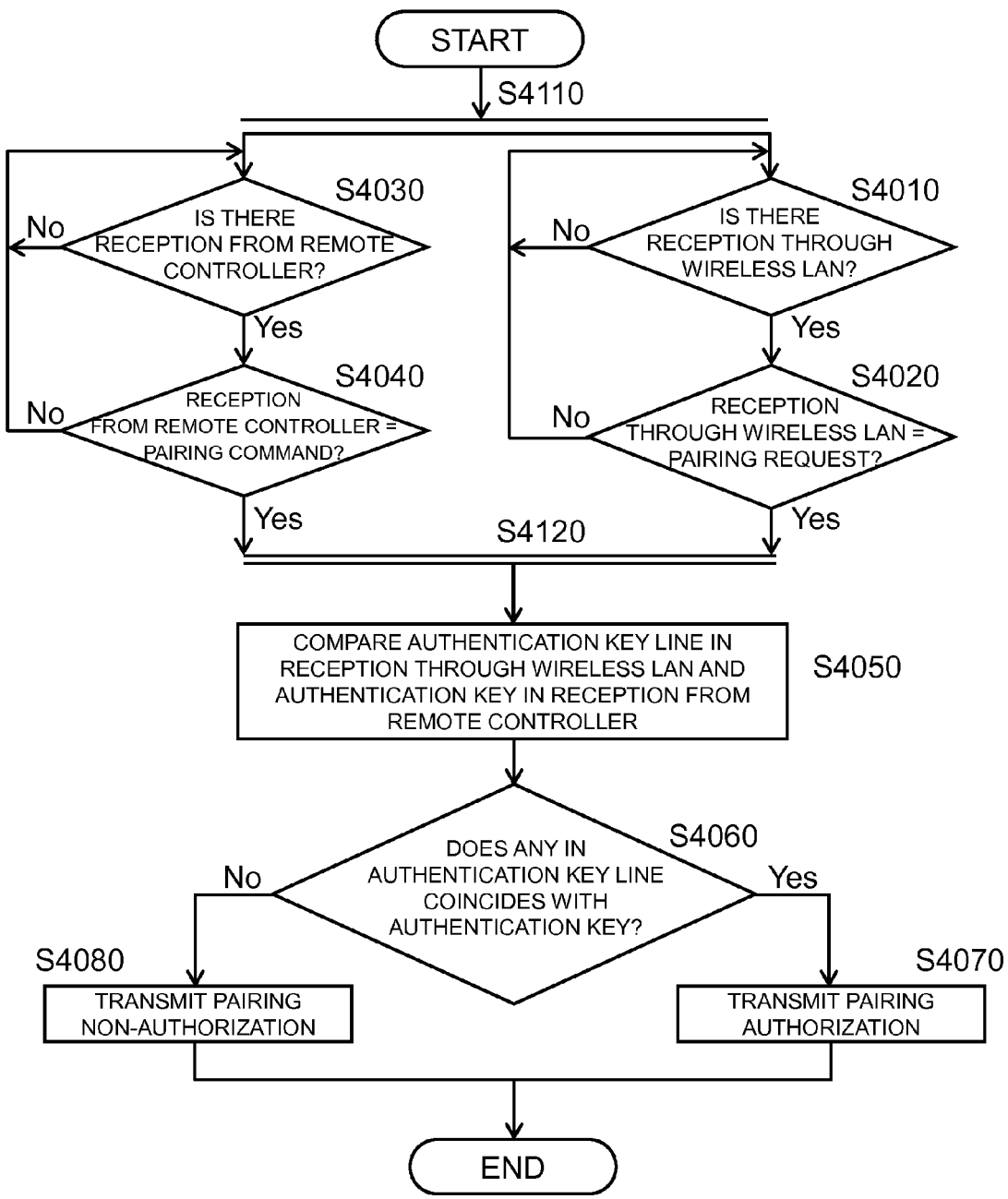
FIG. 14 is a flowchart showing a flow of operations of a master device in the second exemplary embodiment.

FIG. 14 is a flowchart showing a flow of operations of master device 20 in the second exemplary embodiment of the present disclosure.

Next, with reference to FIG. 14, a description is made of the flow of the operations of master device 20 in the second exemplary embodiment of the present disclosure.

Parallel processing of S4010 and S4030 is started (S4110).

Wireless LAN interface 202b waits for the reception of the modulated signal transmitted from slave device 10. Upon receiving the modulated signal, wireless LAN interface 202b informs pairing acceptor 201 of the wireless communication packet, which is taken out by demodulating the modulated signal (S4010).

In a case where the wireless communication packet received from wireless LAN interface 202b is the pairing request, then pairing acceptor 201 extracts the authentication key sequence from the pairing request, informs authentication key determiner 203 of the authentication key sequence, and proceeds to S4120, and otherwise, proceeds to S4010 (S4020).

Infrared ray remote control receiver 205 waits for reception of the modulated signal transmitted from remote control device 30 by using the infrared ray. Upon receiving the modulated signal using the infrared ray, infrared ray remote control receiver 205 demodulates the modulated signal, and informs pairing command monitor 204 of the demodulated signal (S4030).

In a case where the wireless communication packet received from infrared ray remote control receiver 205 is the pairing command, pairing command monitor 204 extracts the authentication key x from this pairing command, informs authentication key determiner 203 of the authentication key x, and proceeds to S4120, and otherwise, proceeds to S4020 (S4040).

With regard to the parallel processing started in S4110, completion of S4020 and completion of S4040 are synchronized with each other (S4120).

Authentication key determiner 203 compares the authentication key sequence, which is received from pairing acceptor 201, and the authentication key x, which is received from pairing command monitor 204, with each other (S4050).

In a case where any authentication key of the authentication key sequence and the authentication key x coincide with each other, authentication key determiner 203 proceeds to S4070, and otherwise, proceeds to S4080 (S4060).

Authentication key determiner 203 informs pairing acceptor 201 of an authentication key coincidence notice, and upon receiving the authentication key coincidence notice, pairing acceptor 201 generates the wireless communication packet corresponding to the pairing authorization, and informs wireless LAN interface 202b of the generated wireless communication packet. Then, wireless LAN interface 202b converts the wireless communication packet, which is received from pairing acceptor 201 and corresponds to the pairing authorization, into a signal, modulates the converted signal, and transmits the modulated signal (S4070).

Authentication key determiner 203 informs pairing acceptor 201 of an authentication key inconsistency notice. Upon receiving the authentication key inconsistency notice, pairing acceptor 201 generates the wireless communication packet corresponding to the pairing non-authorization, and informs wireless LAN interface 202b of the generated wireless communication packet. Wireless LAN interface 202b converts the wireless communication packet, which is received from pairing acceptor 201 and corresponds to the pairing non-authorization, into a signal, modulates the converted signal to the wireless communication packet of the radio wave, and transmits the modulated wireless communication packet (S4080).

In the flow of the operations of remote control device 30 in the second exemplary embodiment of the present disclosure, there is no different point from that in the first exemplary embodiment.

In accordance with such a configuration, for example, even if remote control device 30 is erroneously operated after the authentication key is transmitted from remote control device 30 to slave device 10, and the authentication key newly generated assuming as an input the authentication key transmitted to slave device 10 cannot be sent to master device 20, it becomes possible to perform the authentication correctly by transmitting the authentication key, which is further generated assuming as an input the newly generated authentication key, to master device 20.

Third Exemplary Embodiment

Figure 15:
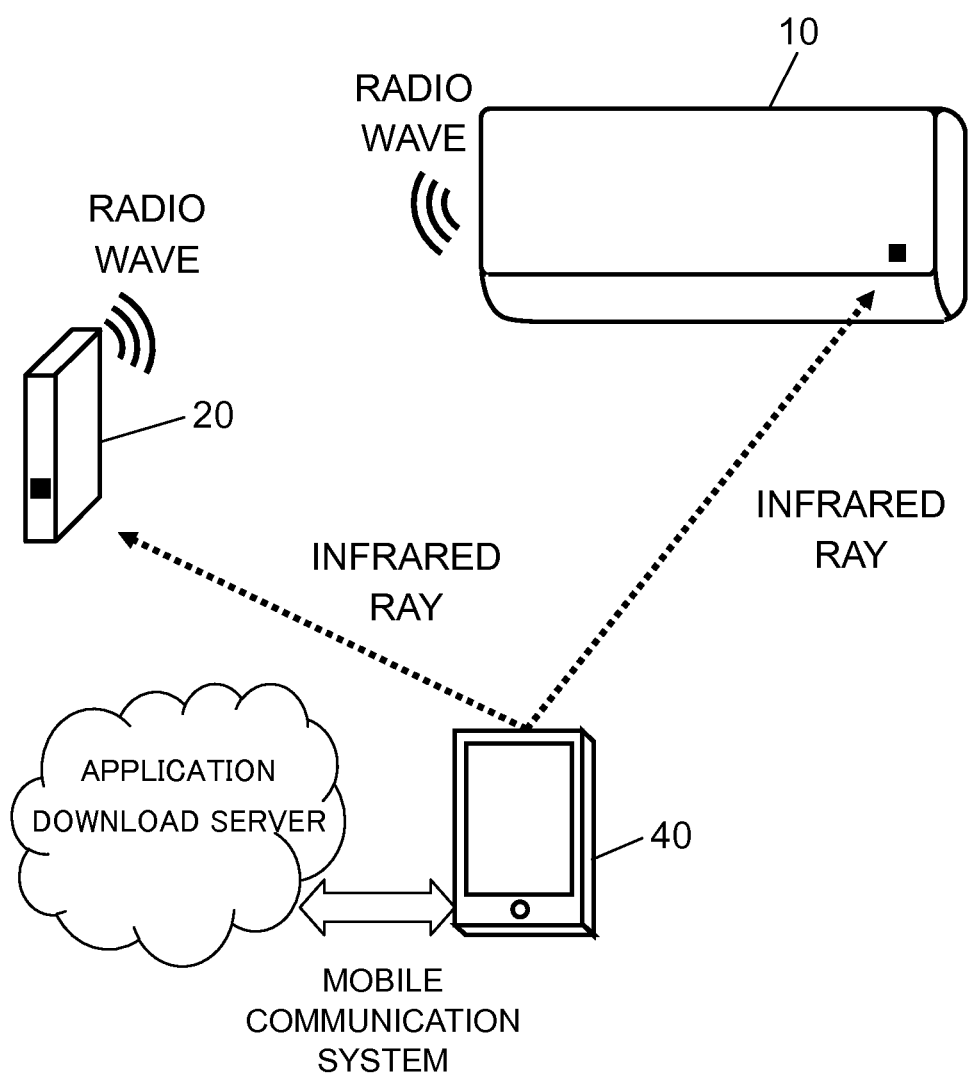
FIG. 15 is a configuration diagram of a wireless communication pairing system in a third exemplary embodiment.

FIG. 15 is a configuration diagram of a wireless communication pairing system in a third exemplary embodiment of the present disclosure.

In the third exemplary embodiment, smart phone 40 is used in place of remote control device 30 used in the first exemplary embodiment in order for the operator of the wireless communication pairing system to hold with the hand and execute the pairing.

With regard to the same functions and operations as those of the first exemplary embodiment, a description is omitted, and different points from the first exemplary embodiment are described.

In smart phone 40 in the third exemplary embodiment of the present disclosure, different points from remote control device 30 of the first exemplary embodiment are as follows.

Smart phone 40 is connected to the Internet by a mobile communication system such as 3G or a wireless LAN. Smart phone 40 is a mobile computer having a CPU, a ROM, a RAM, and a touch display, and downloads and executes a remote control application from an application download server through the Internet.

At this time, the remote control application allows smart phone 40 as a computer to function as: a holder that holds input information; an authentication key generator that, in a case where a predetermined operation input is performed, outputs a newly generated authentication key with a predetermined algorithm assuming as an input the input information held in the holder; a packet generator that generates a packet including the new authentication key; an updater that updates the generated authentication key as new input information; and a transmission circuit that transmits the generated packet to a slave wireless communication device. Moreover, in a case where the predetermined operation input is performed again, the authentication key generator generates a further authentication key with the predetermined algorithm assuming the held input information as an input, the packet generator newly generates a packet including the further authentication key, and the transmission circuit transmits the new packet to a master wireless communication device, whereby smart phone 40 is allowed to function to perform pairing between the master wireless communication device and the slave wireless communication device.

Smart phone 40 further has an infrared ray emitting element. The remote control application is executed in smart phone 40 to control the infrared ray emitting element, and thereby smart phone 40 achieves an equivalent function to that of remote control device 30. As specific examples of a system of downloading the application in smart phone 40, there exist: GooglePlay (registered trademark) oriented to Android (registered trademark) smart phones; and AppStore (registered trademark) oriented to iPhone (registered trademark) of Apple (registered trademark) Inc. Operations of the system of downloading the application are not the principal object of the present application, and accordingly, a description thereof is omitted.

(Modification)

Based on the exemplary embodiments, the description has been made above of the wireless communication device, the wireless communication method, the remote operation device and the remote operation method according to the present disclosure; however, the present disclosure is not limited to the above-described exemplary embodiments.

Moreover, the description has been made of the configuration in which master device 20 includes authentication key determiner 203; however, the configuration is not necessarily limited thereto, and for example, such a configuration may be adopted that authentication key determiner 203 is provided in a server (not shown) connected to master device 20.

In a case where the configuration as described above is adopted, the configuration is made as follow. Master device 20 converts the wireless communication packet, which is received from slave device 10 and includes the pairing request identifier, and the wireless communication packet, which is directly received from remote control device 30 and includes the pairing command identifier, into signals again, modulates the signals as needed, and then sends the modulated signals to the server. The server determines whether or not these two authentication keys coincide with each other, and sends a result of the determination to master device 20. Based on the result of the determination, master device 20 generates the wireless communication packet, which includes the pairing authorization and the pairing response identifier, or the wireless communication packet, which includes the pairing non-authorization and the pairing response identifier, and sends the generated wireless communication packet to slave device 10.

Note that, though the description has been made of the key chain algorithm by using the pseudo-random number, the key chain algorithm may be any algorithm as long as it generates a new key based on a previously generated key and uniquely determines a series of the keys to be generated. For example, the CBC mode in the AES encryption mode is applicable.

Note that, though the description has been made by using the wireless LAN as the first wireless communication unit for forming the subnet by the pairing, the first wireless communication unit is not limited thereto. For example, a specified low power radio network, Bluetooth (registered trademark) and the like are applicable.

Note that, though the description has been made by using the infrared ray remote control as the second wireless communication unit having a communication distance shorter than the communication distance of the first wireless communication unit, the second wireless communication unit is not limited thereto. The second wireless communication unit just needs to be a wireless communication unit which is light or a feeble radio wave that cannot go beyond a wall, a radio wave with high directivity, or the like, and which has a communication distance relatively short or a limited communication range in comparison with the first wireless communication unit.

Note that, typically, the respective functional blocks are realized as an LSI that is an integrated circuit. These may be each formed into one chip, or may be formed into one chip so that a part or all thereof can be included.

Here, the integrated circuit is described as the LSI, but is also sometimes referred to as an IC, a system LSI, a super LSI, or an ultra LSI depending on a difference in degree of integration.

Moreover, a technique of integrated circuit formation is not limited to the LSI, and the integrated circuit may be realized by a dedicated circuit or a general-purpose processor. After the LSI is manufactured, there may be used a programmable FPGA (Field Programmable Gate Array), or a reconfigurable processor in which connection and setting of a circuit cell in an inside of the LSI is reconfigurable.

Furthermore, if there appears a technology of integrated circuit formation, which replaces the LSI, due to a progress of the semiconductor technology or another derivative technology, then naturally, the functional blocks may be integrated by using the technology concerned. Application of the biotechnology or the like may be possible.

What is claimed is:

1. A wireless communication device comprising:
   a wireless communication circuit that receives a first wireless communication packet from a slave wireless communication device by using a first wireless communication mode, the first wireless communication packet including a second authentication key generated with a predetermined algorithm assuming a first authentication key as input information and a pairing request identifier that requests pairing;
   a pairing acceptor that accepts the wireless communication packet received by the wireless communication circuit;
   a reception circuit that directly receives a second wireless communication packet from a remote operation device with a second wireless communication mode different from the first wireless communication mode, the second wireless communication packet including a third authentication key and a pairing command identifier that commands pairing with the slave wireless communication device;

a pairing command monitor that monitors whether or not the reception circuit has received the second wireless communication packet; and an authentication key determiner that determines whether or not the second authentication key extracted from the first wireless communication packet and the third authentication key extracted from the second wireless communication packet coincide with each other, wherein it is determined that the second authentication key and the third authentication key sent from the remote operation device coincide with each other in the authentication key determiner in a case where the third authentication key is generated with same algorithm as the predetermined algorithm assuming the first authentication key as input information.

2. The wireless communication device according to claim 1, wherein, in a case where it is determined that the second authentication key and the third authentication key coincide with each other by the authentication key determiner, a wireless communication packet is transmitted to the slave wireless communication device by using the wireless communication circuit, the wireless communication packet including information indicating that the pairing with the slave wireless communication device is authorized.

3. The wireless communication device according to claim 2, wherein the first authentication key to be used as the input information in the slave wireless communication device is generated in the remote operation device with the same algorithm as the predetermined algorithm in response to an operation input of the remote operation device, and is thereafter transmitted from the remote operation device to the slave wireless communication device with the second wireless communication mode.

4. The wireless communication device according to claim 2, wherein the packet including the pairing request identifier further includes an authentication key further generated with a predetermined algorithm assuming the second authentication key as input information, and in a case where the third authentication key sent from the remote operation device is generated with the same algorithm as the predetermined algorithm assuming the first authentication key or the second authentication key as input information, the authentication key determiner determines that either of the second authentication key or the further generated authentication key and the third authentication key coincide with each other.

5. A wireless communication method comprising:

a wireless communication step of receiving a first wireless communication packet from a slave wireless communication device by using a first wireless communication mode, the first wireless communication packet including a second authentication key generated with a predetermined algorithm assuming a first authentication key as input information and a pairing request identifier that requests pairing;

a pairing acceptance step of accepting the wireless communication packet received by the wireless communication circuit;

a reception step of directly receiving a second wireless communication packet from a remote operation device with a second wireless communication mode different from the first wireless communication mode, the second wireless communication packet including a third authentication key and a pairing command identifier that commands pairing with the slave wireless communication device;

a pairing command monitoring step of monitoring whether or not the second wireless communication packet is received in the reception step; and an authentication key determination step of determining whether or not the second authentication key extracted from the first wireless communication packet and the third authentication key extracted from the second wireless communication packet coincide with each other, wherein it is determined that the second authentication key and the third authentication key sent from the remote operation device coincide with each other in the authentication key determination step in a case where the third authentication key is generated with same algorithm as the predetermined algorithm assuming the first authentication key as input information.

6. A remote operation device that performs pairing between a master wireless communication device and a slave wireless communication device by a remote operation, the remote operation device comprising:

a holder that holds input information;

an authentication key generator that, in a case where a predetermined operation input is performed, outputs an authentication key newly generated with a predetermined algorithm assuming as an input the input information held in the holder;

a packet generator that generates a packet including the new authentication key;

an updater that updates the generated authentication key as new input information; and a transmission circuit that transmits the generated packet to the slave wireless communication device, wherein, in a case where the predetermined operation input is performed again, the authentication key generator generates a further authentication key with the predetermined algorithm assuming the held input information as an input, the packet generator newly generates a packet including the further authentication key, and the transmission circuit transmits the new packet to the master wireless communication device.

7. The remote operation device according to claim 6, comprising:

a sensor that senses a reset signal; and a counter that starts a counting operation after the reset signal is sensed, wherein the holder holds a count value by the counter as input information during a period from when the reset signal is sensed until when the predetermined operation input is performed.

8. The remote operation device according to claim 6, wherein the authentication key generated with the predetermined algorithm is a random number generated with an algorithm that generates the random number.

9. A remote operation method using a remote operation device that performs pairing between a master wireless communication device and a slave wireless communication device by a remote operation, the remote operation method comprising:

a holding step of holding input information;

an authentication key generation step of, in a case where a predetermined operation input is performed, outputting an authentication key newly generated with a predetermined algorithm assuming as an input the input information held in a holder provided in the remote operation device;
a packet generation step of generating a packet including the new authentication key;
an updating step of updating the generated authentication key as new input information; and
a transmitting step of transmitting the generated packet to the slave wireless communication device,
wherein, in a case where the predetermined operation input is performed again, the authentication key generation step generates a further authentication key with the predetermined algorithm assuming the held input information as an input,
the packet generation step newly generates a packet including the further authentication key, and
the transmission step transmits the new packet to the master wireless communication device.

10. A remote operation device having a program stored thereon for allowing a computer to execute a remote operation method for performing pairing between a master wireless communication device and a slave wireless communication device by a remote operation, the remote operation method comprising:
a holding step of holding input information;
an authentication key generation step of, in a case where a predetermined operation input is performed, outputting an authentication key newly generated with a predetermined algorithm assuming as an input the input information held in a holder provided in the remote operation device;
a packet generation step of generating a packet including the new authentication key;
an updating step of updating the generated authentication key as new input information; and
a transmitting step of transmitting the generated packet to the slave wireless communication device,
wherein, in a case where the predetermined operation input is performed again, the authentication key generation step generates a further authentication key with the predetermined algorithm assuming the held input information as an input,
the packet generation step newly generates a packet including the further authentication key, and
the transmission step transmits the new packet to the master wireless communication device.

11. The remote operation device according to claim 10, wherein the remote operation device is a smart phone that has the program downloaded thereon.

* * * * *